United States Patent [19]

Bonne

[11] 3,858,001
[45] Dec. 31, 1974

[54] STEREOSCOPIC DISPLAY SYSTEM
[75] Inventor: Ulrich Bonne, Hopkins, Minn.
[73] Assignee: Honeywell, Inc, Minneapolis, Minn.
[22] Filed: May 11, 1973
[21] Appl. No.: 359,574

[52] U.S. Cl. .................................. 178/6.5, 350/150
[51] Int. Cl. ........................... G02f 1/26, H04n 9/58
[58] Field of Search ...................... 178/6.5; 350/150

[56] References Cited
UNITED STATES PATENTS

| | | | |
|---|---|---|---|
| 2,865,988 | 12/1958 | Cafarelli | 178/6.5 |
| 3,358,079 | 12/1967 | Banning | 178/6.5 |
| 3,501,219 | 3/1970 | Caulfield | 350/150 |
| 3,650,600 | 3/1972 | Courtens | 350/150 |
| 3,661,442 | 5/1972 | Kumada | 350/150 |
| 3,666,350 | 5/1972 | Ohm | 350/150 |
| 3,695,747 | 10/1972 | Maldonado | 350/150 |
| 3,781,084 | 12/1973 | Fukuhara | 350/150 |
| 3,784,280 | 1/1974 | Bigelow | 350/150 |

Primary Examiner—Howard W. Britton
Attorney, Agent, or Firm—David R. Fairbairn

[57] ABSTRACT

A stereoscopic display system provides simulated three-dimensional images. First and second slightly displaced images of a scene are projected sequentially on a common viewing screen. Controllable polarizing means, which is positioned proximate the image generating means, provides the first images with a first polarization direction and provides the second images with a second polarization direction. The viewer wears spectacles containing first and second analyzers. The first analyzer, which is positioned proximate one eye of the viewer, is oriented to pass light having the first polarization direction and block light having the second polarization direction. The second analyzer, which is positioned proximate the other eye of the viewer, is oriented to pass light having the second polarization direction and block light having the first polarization direction.

17 Claims, 6 Drawing Figures

STEREOSCOPIC DISPLAY SYSTEM

BACKGROUND OF THE INVENTION

The present invention relates to stereoscopic display systems. In particular, the present invention is directed to a motion picture or television system capable of producing simulated three-dimensional images.

The two eyes of a human viewer see slightly different retinal images of the same scene. The brain combines these two images to achieve three-dimensional or depth perception. In conventional motion picture and television displays, however, the picture on the screen is two-dimensional rather than three-dimensional.

In the past, various stereoscopic systems capable of producing a simulated three-dimensional motion picture or television display have been proposed. These stereoscopic systems generally include a camera for taking two slightly displaced pictures of a scene. These two slightly displaced pictures are then displayed on a common screen in such a manner that the left eye of the observer views only one of the two slightly displaced pictures, and the right eye of the observer observes only the other of the two slightly displaced pictures.

In one prior art stereoscopic motion pictures system, the two slightly different images are simultaneously projected on a common screen by two projectors. The two images are polarized in planes perpendicular to one another. The viewer wears a pair of analyzers oriented with their optical axes perpendicular to one another. The analyzer for the left eye passes only one of the two images, and the analyzer for the right eye passes only the other of the two images. This stereoscopic system has several disadvantages. First, it requires two projectors to simultaneously project the two images. Second, this system cannot be readily adapted to a television system.

Another stereoscopic system uses the simultaneous projection of two slightly displaced images of different color. The viewer wears glasses containing a different color filter for each eye. This system has the same drawbacks as the system using simultaneous projection of polarized images. In addition, the color filters generally do not provide a satisfactory separation of the two displaced images.

Still another stereoscopic system involves sequential rather than simultaneous projection. The two images are sequentially and alternately displayed on a common screen at a sufficiently high rate that the eyes of the viewer are insensitive to the periodic interruptions. The eyes of the viewer behave as if the two images were being simultaneously projected. In these sequential stereoscopic systems, the viewer is provided with a shuttering device which is synchronized to the sequential presentation of images. The shuttering device allows only one eye to view the screen at a time. The shuttering device worn by the observer may be of a mechanical type as shown by J. W. Knauf (U.S. Pat. No. 3,464,766) and K. Hope (U.S. Pat. No. 3,621,127), or it may be of the magneto-optic type as shown in T. A. Banning Jr. (U.S. Pat. No. 3,358,079).

The sequential stereoscopic systems use a single projector and can be adapted to television systems. There are, however, several disadvantages to the sequential stereoscopic systems. The shuttering action must be perfectly coordinated with the projection of the images. For this reason, a synchronizing link must be maintained between the projector and the viewing glasses of each viewer. This synchronizing link may be provided by wires or cables, or by wireless transmitter and receiver systems as proposed by K. Hope in U.S. Pat. No. 3,621,127. In either case, the equipment required to implement the sequential stereoscopic system is relatively complex and expensive, especially since every viewer has to be equipped with a set of shutters. In addition, the shuttering mechanism plus either a radio receiver or wires for synchronization make the viewer glasses bulky and uncomfortable. The application of electrical signals to the viewer's glasses for synchronization and energization of the shuttering device also poses a possible safety hazard.

A sequential stereoscopic television system which does not require a shuttering mechanism in the viewer glasses is proposed by T. A. Banning Jr. in U.S. Pat. No. 3,358,079. Narrow strips of polarizing material are placed on the face of the television picture tube. The polarizing strips alternately are oriented to polarize light in a first or a second polarization direction. The first image is produced by scanning the areas covered by the polarizing strips oriented to polarize light in the first polarization direction. Likewise, the second image is produced by scanning the areas covered by the polarizing strips oriented to polarize light in the second polarization direction. The viewer wears analyzer glasses like those used in simultaneous projection systems.

The system proposed by Banning is somewhat difficult to achieve in practice: First, the image stability requirements are very stringent and second, overlapping areas of the interlaced, doubly scanned frame will generate fuzzy three-dimensional images. In addition, the resolution of the television display is reduced since only half of the strips are used for each image.

SUMMARY OF THE INVENTION

In the stereoscopic display system of the present invention, image generating means sequentially project first and second images of a scene on a common screen. The first and second images are shown alternately for substantially equal time periods. Controllable polarizing means, which is positioned proximate the image generating means, provides the first images with a first polarization direction and provides the second images with a second polarization direction. The operation of the image generating means and the controllable polarizing means is synchronized by synchronizing means.

The viewer wears spectacles or glasses which include first and second analyzer means. The first analyzer means is positioned proximate the first eye of the viewer, and is oriented to pass light having the first polarization direction and to block light having the second polarization direction. Similarly, the second analyzer means is positioned proximate the second eye of the viewer. The second analyzer means is oriented to pass light having the second polarization direction and to block light having the first polarization direction.

DESCRIPTION OF THE PREFERRED EMBODIMENTS

Figure 1:
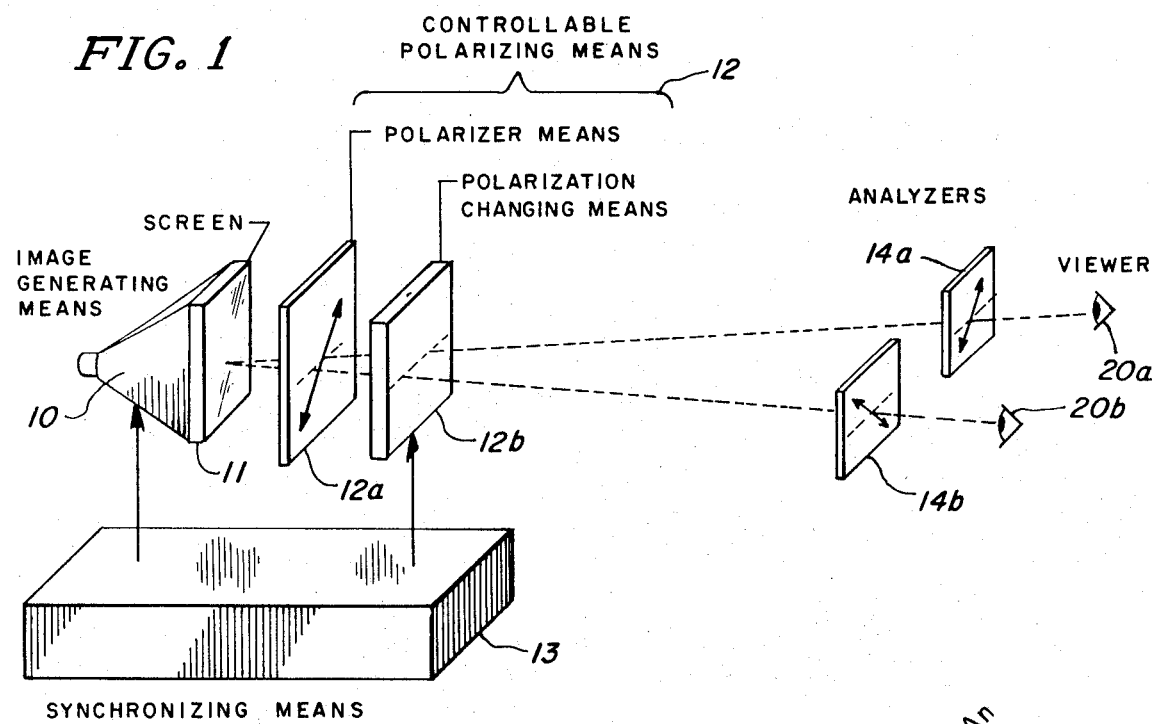
FIG. 1 shows the stereoscopic display system of the present invention.

FIG. 1 schematically shows the stereoscopic display system of the present invention. The system, which may be viewed by several viewers positioned at random positions within a prescribed viewing area, includes image generating means 10, common screen 11, controllable polarizing means 12, synchronizing means 13, and a pair of glasses 14 for each viewer.

Image generating means 10, which may comprise a television or motion picture projector, projects first and second images of a scene on a common screen 11 in a manner similar to the prior art sequential stereoscopic displays. The first and second images are shown alternately for substantially equal time periods. Controllable polarizing means 12, which is positioned proximate image generating means 10, polarizes the first images in the first polarization direction and polarizes the second images in the second polarization direction. The operation of image generating means 10 and controllable polarizing means 12 is synchronized by synchronizing means 13.

The viewer wears a pair of glasses or spectacles 14 containing first and second analyzer means 14a and 14b. The first analyzer means 14a is positioned proximate a first eye 20a of the viewer, and second analyzer means 14b is positioned proximate the second eye 20b of the viewer. The first analyzer means 14a is oriented to pass light having the first polarization direction and to block light having the second polarization direction. The transmission axis of the second analyzer means 14b, on the other hand, is oriented to pass light having the second polarization direction and to block light having the first polarization direction.

In operation, the image generating means 10 sequentially produces a first image for eye 20a and then a second image for eye 20b. The operation of controllable polarizing means 12 is synchronized with the operation of image generating means 10 so that when the first image appears on screen 11, the light reaching the viewer has the first polarization direction. The first image, therefore, passes through analyzer 14a to eye 20a but is blocked by analyzer 14b. Conversely, when the second image appears on screen 11, controllable polarizing means 12 provides the light reaching the viewer with the second polarization direction so that the second image passes through analyzer 14b to eye 20b but is blocked by analyzer 14a. The projection rate of the first and second images is high enough that viewer perceives a continuous three-dimensional image.

The stereoscopic display system of the present invention has several advantages over the prior art stereoscopic displays. First, only one image generating system is required, unlike the simultaneous projection systems of the prior art. Second, the stereoscopic display system is readily adaptable to existing television display systems. Third, only a single shutter system is required for a viewing audience, rather than two systems for each viewer as required by the prior art sequential display systems. Fourth, there are no moving or mechanical shutters in the present stereoscopic display system. Fifth, the spectacles worn by the viewer are passive rather than active devices. No interconnection by wire or radio waves is required between the image generator and the viewer. Since the spectacles are passive devices, they require no voltages to be applied.

When the common screen 11 is incorporated as part of image generating means 10, as in a television system, controllable polarizing means 12 is positioned proximate common screen 11. Light emerging from common screen 11 passes through controllable polarizing means 12 as shown in FIG. 1.

When a motion picture system is employed, controllable polarizing means polarizes light emerging from the motion picture projector. In that case common screen 11 must be a nondepolarizing screen.

As shown in FIG. 1, controllable polarizing means 12 may comprise polarizer means 12a and polarization changing means 12b. Polarizer means 12a, which may comprise a single sheet of polarizer film or may be a multi-layer device of the type described by H. G. Rogers in U.S. Pat. Nos. 3,528,723 and Re.26,506, polarizes the light emerging from the image generating means in a first polarization direction. Polarization changing means 12b sequentially changes the polarization of the light from the polarizer means between the first polarization direction when first images are projected and the second polarization direction when second images are projected.

In one preferred embodiment of the system shown in FIG. 1, polarization changing means 12b comprises an electro-optic medium having electric field controllable birefringence and electrode means for applying an electric field to the electro-optic medium. The electro-optic medium may comprise a fine grained, optically birefringent ferroelectric ceramic material such as lanthanum modified lead zirconate titanate (PLZT), or a nematic liquid crystal cell operated in the tunable birefringence mode. The electrode means periodically apply an electric field to the electro-optic medium to cause a one-half wavelength retardation change.

In another embodiment of the present invention, polarization changing means 12b comprises an electro-optic medium having electric field controllable optical activity and electrode means for applying an electric field to the electro-optic medium to cause a periodic 90° change in the optical activity. In this manner the polarization direction is periodically shifted between the first polarization direction and the second polarization direction. One electro-optic medium capable of a 90° change in optical activity is described by M. Schadt and W. Helrich, "Voltage-Dependent Optical Activity of a Twisted Nematic Liquid Crystal," *Applied Physics Letters*, 18, 127 (1971).

Controllable polarizing means 12 may also comprise a highly efficient multi-layer device. The multi-layer device receives unpolarized light from the image generating means 10 and transmits a large portion of the light. It imparts a first polarization direction to light from the first images and imparts a second polarization direction to light from the second images.

The multi-layer device of the present invention is generally similar in construction to the multi-layer polarizing device described by H. G. Rogers in U.S. Pat. Nos. 3,528,723 and Re.26,506 and may utilize the materials, configurations, and processes described in the Rogers' patents. The multi-layer device of the present invention differs from the devices shown by the Rogers' patent in that it provides controllable polarizing capabilities.

Figure 2:
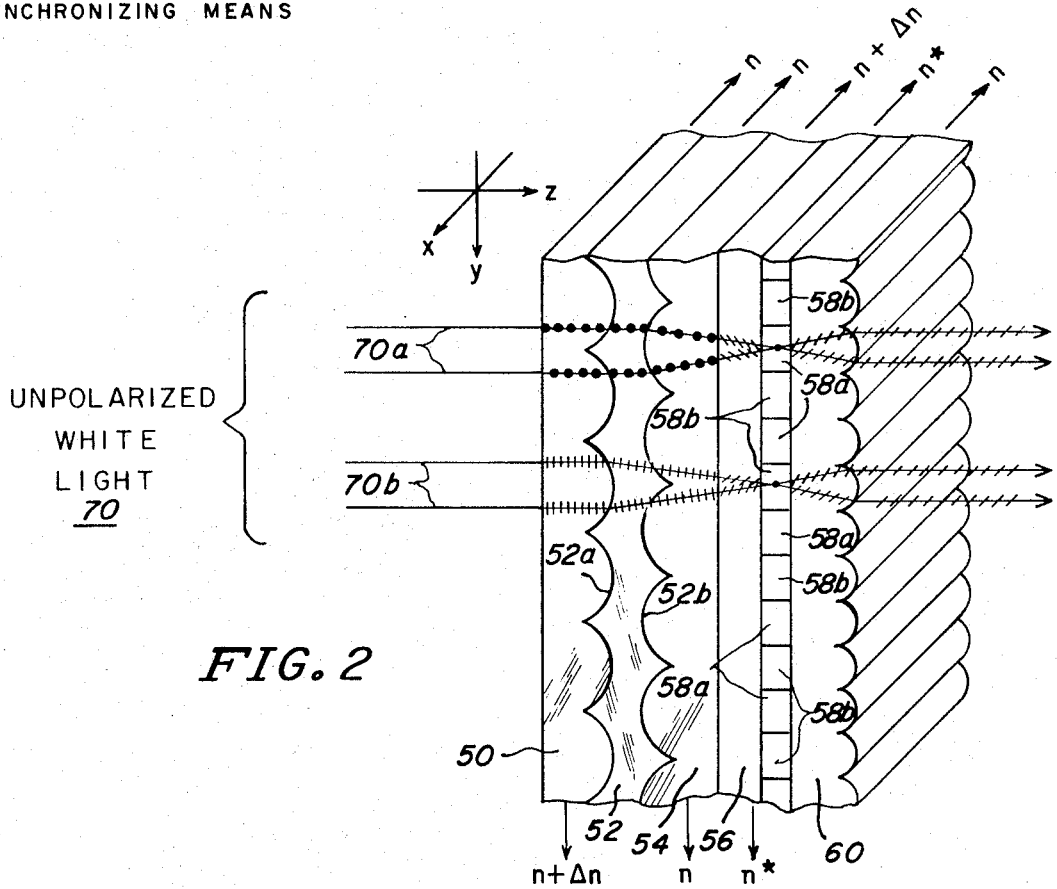
FIG. 2 shows a low light loss controllable polarizing device for use in the stereoscopic display system of FIG. 1.

One embodiment of the multi-layer controllable polarizing device of the present invention is shown in FIG. 2. It comprises a birefringent layer 50, isotropic layer 52, birefringent layer 54, optically active isotropic layer 56, controllable polarizing elements 58, and isotropic layer 60.

The indices of refraction of the various layers in the x and y directions are shown in FIG. 2. The refractive index of layer 50 in the x direction matches the refractive index of layer 52, while the refractive index of layer 50 in the y direction does not match the refractive index of layer 52. In similar fashion, the refractive index of layer 54 in the y direction matches the refractive index of layer 52, but the refractive index of layer 54 in the x direction does not match the refractive index of layer 52.

The interface between layers 50 and 52 is a configurated surface. In particular, the interface 52a is composed of a plurality of cylindrical lenslets or lenticular elements. Interface 52b between layer 52 and layer 54 is similarly configurated. The lenticular elements at surface 52b, however, are offset with respect to the lenticular elements of layer 52a.

Unpolarized light 70 from image generating means 10 comprises two components, the ordinary or O-rays 70a and the extraordinary or E-rays 70b. As shown in FIG. 2, the O-rays have a vibration azimuth corresponding to the x direction while the E-rays have a vibration azimuth corresponding to the y direction.

The E- and O-rays are resolved at interface 52a. The refractive indices of layers 50 and 52 in the x direction are substantially identical, and O-rays 70a therefore are not refracted by the lenticules of interface 52a. There is, on the other hand, a difference between the refractive indices of layers 50 and 52 in the y direction. As a result, E-rays 70b converge as they pass from layer 50 to layer 52.

At interface 52b, E-rays 70b are not refracted since the indices of refraction in the y direction are substantially identical for layers 52 and 54. O-rays 70a, on the other hand, are convergently refracted at interface 52b due to the difference in refractive index in the x direction between layers 52 and 54.

As a result of the refraction of the E- and O-rays at interfaces 52a and 52b, the E- and O-rays are separated into a plurality of spaced apart components converging toward areas of substantial focus. The O-rays are converged toward areas of substantial focus which are laterally interpositioned between the areas of focus of the E-rays.

Once the E- and O-rays have been separated, it is possible to separately alter their vibration azimuths to provide a desired polarization direction. In the device shown in FIG. 2, the first and second polarization directions required for the stereoscopic display system are orthogonal to one another and oriented at 45° with respect to the xz and yz planes. It is therefore necessary to modify the vibration azimuths of O-ray and the E-ray components so that all of the emerging rays have the first polarization direction when the first image is projected and the second polarization direction when the second image is projected. This function is accomplished by optically active isotropic layer 56 and controllable polarizing elements 58.

Optically active isotropic layer 56 has an index of refraction which differs from the indices of refraction of layer 54. As a result, both the O-ray components 70a and the E-ray components 70b have their vibration azimuths modified. Optically active isotropic layer 56, which may comprise, for example, a sugar solution, is selected to impart a 45° turn of change in the vibration azimuths of O-rays 70a and E-rays 70b.

In the embodiment shown in FIG. 2, the controllable polarizing elements comprise an elector-optic medium having electric field controllable birefringence and electrodes for applying an electric field to the electro-optic medium. In particular, the controllable polarizing elements comprise strips of electro-optic ceramic PLZT. A first plurality of PLZT strips 58a are arranged to intercept E-rays 70b while a second plurality of PLZT strips 58b are arranged to intercept the O-rays 70a.

Figure 3A:
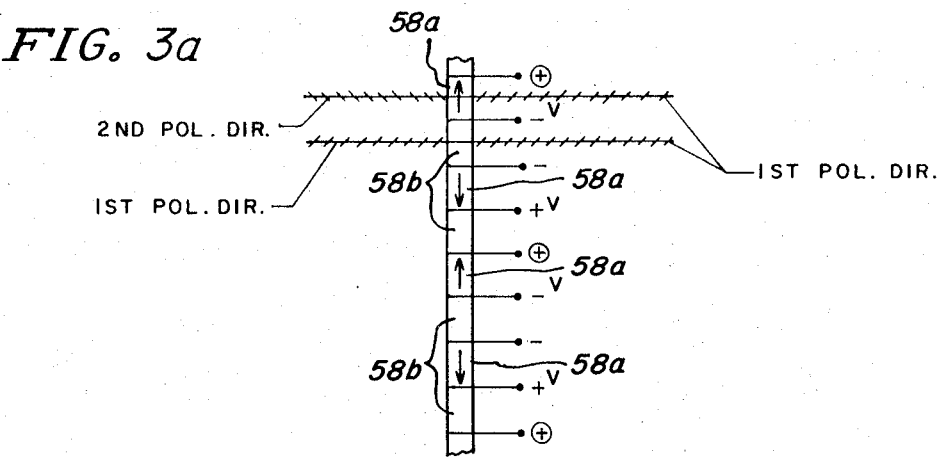
FIGS. 3a and 3b diagrammatically illustrate the operation of the controllable polarizing device of FIG. 2.
Figure 3B:
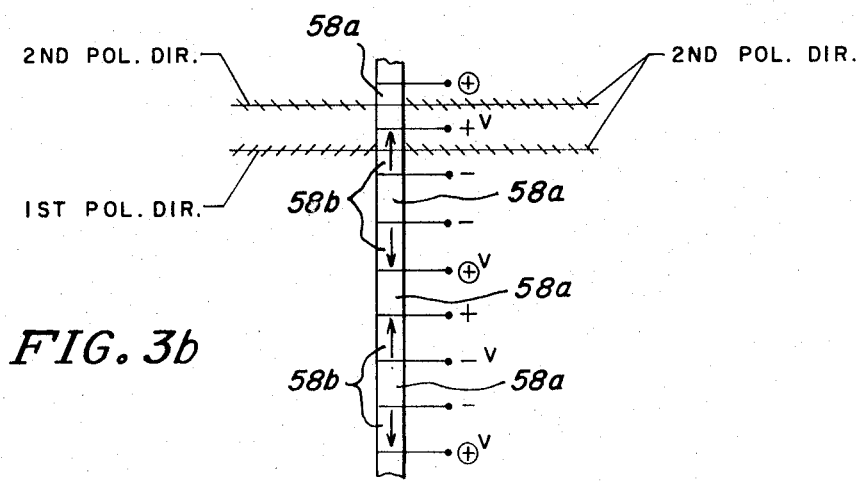

The operation of the controllable polarizing elements is illustrated in FIGS. 3a and 3b. When an electric field is applied to the first pluraltiy of PLZT strips 58a (FIG. 3a), the vibration azimuth of the E-ray components is changed from the second polarization direction to the first polarization direction. Since the O-ray components are already polarized in the first polarization direction, the entire light beam is polarized in the first polarization direction when the first plurality of PLZT strips are energized. The first plurality of PLZT strips are therefore energized when the first image is being projected by image generating means 10.

Similarly, when an electric field is applied to each of the second plurality of PLZT strips 58b (FIG. 3b) the polarization of the O-ray components is changed from the first polarization direction to the second polarization direction. The second plurality of PLZT strips 58b are therefore energized when the second image is projected by the image generating means.

Isotropic layer 60 receives the E- and O-rays from controllable polarizing elements 58a and 58b. The lenticulated surface 60a of isotropic layer 60 collimates the rays as they emerge from the multi-layer device.

In other embodiments of the multi-layer controllable polarizing device, optically active isotropic layer 56 and PLZT strips 58a and 58b can, for example, be replaced by an etectro-optic medium having electric field controllable optical activity. Transparent electrode strips energize and modulate the optical activity of the electro-optic medium so as to selectively rotate the plane of polarized light passing through the alternating strips by ±45°. A suitable electro-optic medium capable of the necessary 90° change in optical activity is described in the previously cited article by M. Schadt and W. Helfrich.

In another embodiment, the optic axes of layers 50 and 54 are oriented at 45° with respect to the xz and yz planes. In this arrangement the optically active isotropic layer is not necessary since the vibration azimuths of the O-ray and E-ray components will have either the first or the second polarization direction as a result of the orientation of the optical axes of layers 50 and 54.

In the embodiments described above, the controllable polarizing means has comprised a device having electrically controllable optical properties. These embodiments have the advantage that no mechanical motion of the controllable polarizing means is required. This is a particular advantage in a stereoscopic television system.

In a stereoscopic motion picture system, mechanical motion of the controllable polarizing means is often acceptable. A mechanically controllable polarizing means generally comprises polarizer means for polarizing light emerging from image generating means 10 and means for orienting the polarizer means to polarize the first images in the first polarization direction and the second images in the second polarization direction. As in previous embodiments, the operation of the mechanically controllable polarizing means and image generating means 10 is synchronized by synchronizing means 13.

Figure 4A:
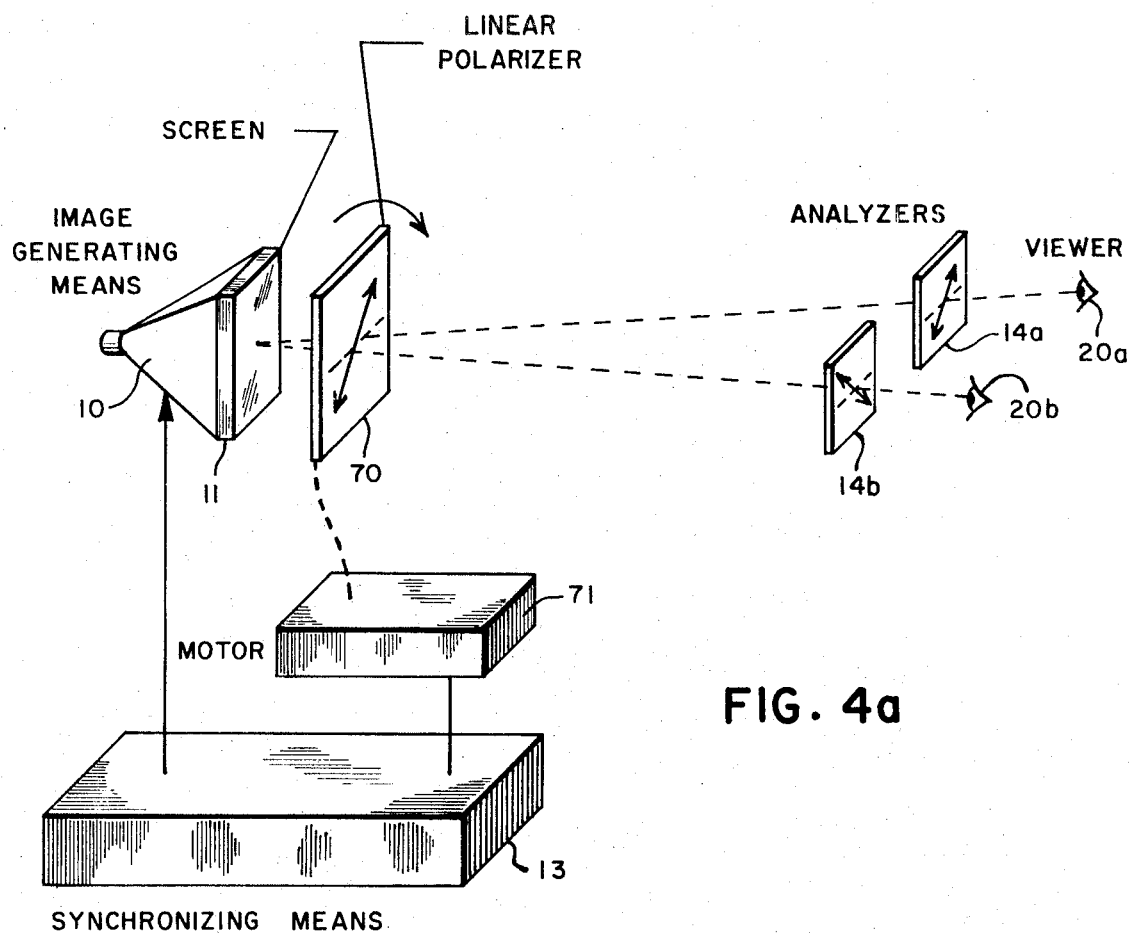
FIGS. 4a and 4b show other embodiments of the stereoscopic display system of the present invention.

Although the orientation of the polarizer means may be accomplished in many ways, the orientation is preferably achieved by step-wise rotation of the polarizer means. In one preferred embodiment shown in FIG. 4a, polarizer 70 means comprise a linear polarizer. A motor 71 rotates the linear polarizer 70 by 90° in a step-wise manner. The polarization direction of light from the linear polarizer 70 is therefore alternately switched between the first and second polarization directions.

Figure 4B:
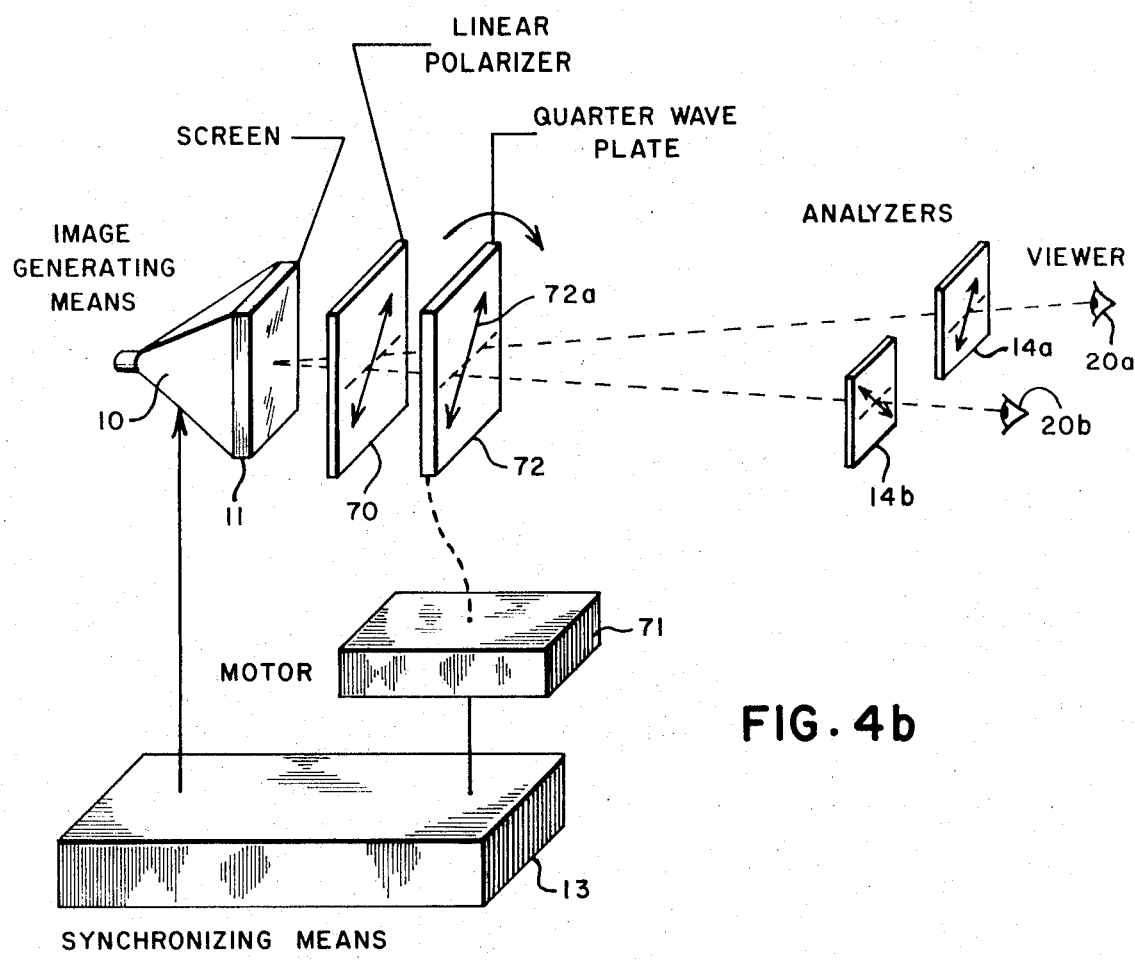

In another embodiment shown in FIG. 4b, the polarizer means comprise a linear polarizer and a quarter-wave plate 72. Light from image generating means 10 passes through the linear polarizer 70 and is polarized in the first polarization direction, and then passes through the quarter-wave plate 72. When the optic axis 72a of the quarter-wave plate 72 is oriented parallel or perpendicular to the polarizing direction of the linear polarizer 70, the polarization direction of the light is unchanged. When the optical axis 72a of the quarter-wave plate 72 is oriented at 45° to the polarizing direction of the linear polarizer 70, the polarization direction of the light is changed by 90°. In this embodiment, therefore, a motor 71 is used to cause step-wise rotation in 45° increments. Either the linear polarizer 70 or the quarter-wave plate 72 may be rotated, provided a relative rotation of the quarter-wave plate 72 with respect to the linear polarizer 70 is achieved.

The mechanically controllable polarizing means have an important advantage in a stereoscopic display system. Presently available polarizers for use in the mechanical system have very high optical quality.

It will be understood that various changes in the details, materials and arrangements of elements which have been described may be made by those skilled in the art without department from the principle and scope of the present invention. It is furthermore understood that such changes do not detract from the discussed advantages of the present invention over the prior art stereoscopic displays.

The embodiments of the invention in which an exclusive property or right is claimed are defined as follows:

1. A stereoscopic display system for providing stereoscopic images on a common screen which are viewable by viewers at random positions within a prescribed viewing area, the stereoscopic display system comprising:

image generating means for sequentially projecting on the common screen first and second images of a scene to produce a presentation in which the first and second images are shown alternately for substantially equal time periods;

controllable polarizing means proximate the image generating means for providing the first images with a first polarization direction and for providing the second images with a second polarization direction, the controllable polarizing means comprising:

first layer means including a first interface, the first interface being substantially nonfractive of a first portion of the light rays having one vibration azimuth but refractive of a second portion of the light rays having another vibration azimuth, the first interface being bounded on at least one side by a birefringent layer having one index of refraction substantially equal to an index of refraction of a layer at the opposite side thereof and a second index of refraction differing therefrom, the first interface being configurated to refract the second portion of the light rays into a plurality of second spaced apart components converging toward areas of substantial focus;

second layer means including a second interface, the second interface being substantially nonrefractive of the second portion of the light rays but refractive of the first portion thereof, the second interface being bounded on at least one side by a birefringent layer having one index of refraction substantially equal to an index of refraction of a layer at the opposite side thereof and a second index of refraction differing therefrom, the second interface being configurated to refract the first portion of the light rays into a plurality of first spaced apart components converging toward substantial focus at areas which are laterally interpositioned between the areas of focus of the second spaced apart components; and third layer means for individually controlling the vibration azimuths of the first and second spaced apart components to correspond to the first polarization direction when the first image is projected by the image generating means and to correspond to the second polarization direction when the second image is projected by the image generating means; and synchronizing means for synchronizing the operation of the image generating means and the controllable polarizing means;

first analyzer means adapted to be positioned proximate a first eye of a viewer, the first analyzer means being oriented to pass light having the first polarization direction and to block light having the second polarization direction; and second analyzer means adapted to be positioned proximate a second eye of a viewer, the second analyzer means being oriented to pass light having the second polarization direction and to block light having the first polarization direction.

2. The stereoscopic display system of claim 1 wherein the multi-layer device further comprises:

fourth layer means including a lenticulated surface for collimating the first and second spaced apart components upon emergence from the multi-layer device.

3. The stereoscopic display system of claim 1 wherein the vibration azimuth of the first portion of the light rays corresponds to the first polarization direction and wherein the vibration azimuth of the second portion of the light rays corresponds to the second polarization direction.

4. The stereoscopic display system of claim 3 wherein the third layer means comprises:

a first plurality of controllable polarizing elements arranged to intercept the second spaced apart components for changing the vibration azimuth of the second spaced apart components from the second polarization direction to the first polarization direction when the first image is projected by the image generating means; and a second plurality of controllable polarizing elements arranged to intercept the first spaced apart components for changing the vibration azimuth of the first spaced apart components from the first polarization direction to the second polarization direction when the second image is projected by the image generating means.

5. The stereoscopic display system of claim 1 wherein the vibration azimuths of the first and second portions of the light rays do not correspond to the first and second polarization directions.

6. The stereoscopic display system of claim 5 wherein the third layer means comprises:

optically active isotropic layer means for changing the vibration azimuths of the first and second portions of the light rays so that the vibration azimuth of the first portion corresponds to the first polarization direction and the vibration azimuth of the second portion corresponds to the second polarization direction;

a first plurality of controllable polarizing elements arranged to intercept the second spaced apart components for changing the vibration azimuth of the second spaced apart components from the second polarization direction to the first polarization direction when the first image is projected by the image generating means; and a second plurality of controllable polarizing elements arranged to intercept the first spaced apart components for changing the vibration azimuth of the first spaced apart components from the first polarization direction to the second polarization direction when the second image is projected by the image generating means.

7. A stereoscopic display system for providing stereoscopic images on a common screen which are viewable by viewers at random positions within a prescribed viewing area, the stereoscopic display system comprising:

image generating means for sequentially projecting on the common screen first and second images of a scene to produce a presentation in which the first and second images are shown alternately for substantially equal time periods;

controllable polarizing means proximate the image generating means for providing the first images with a first polarization direction and for providing the second images with a second polarization direction; the controllable polarizing means comprising:

a plurality of layers of optically clear materials arranged sequentially between entrance and exit surfaces of the device with interfaces between the layers;

means including a first interface substantially unrefractive of a first portion of light rays incident thereon having one vibration azimuth but refractive of a second portion of incident light rays having another vibration azimuth, the first interface being bounded on one side by a birefringent material having at least one index of refraction substantially equal to an index of refraction of material on the opposite sides of the first interface and at least one index of refraction substantially dissimilar from any index of refraction of material on the opposite side of the first interface, the first interface being configurated to refract the second portion of light into a plurality of spaced apart second beam components converging toward substantial focus;

means including a second interface substantially unrefractive of the second portion of light but refractive to the first portion of light, the second interface being bounded on one side by a birefringent material having at least one index of refraction substantially equal to an index of refraction of material on the opposite side of the second interface and at least one index of refraction substantially dissimilar of any index of refraction of the material on the opposite side of the second interface, the second interface being configurated to refract the first portion of light into a plurality of spaced apart first beam components converging toward substantial focus in areas interpositioned between the plurality of second beam components; and means for individually controlling the vibration azimuths of the first and second components to correspond with the first polarization direction when the first image is projected and to correspond to the second polarization direction when the second image is projected; and synchronizing means for synchronizing the operation of the image generating means and the controllable polarizing means;

first analyzer means adapted to be positioned proximate a first eye of a viewer, the first analyzer means being oriented to pass light having the first polarization direction and to block light having the second polarization direction; and second analyzer means adapted to be positioned proximate a second eye of a viewer, the second analyzer means being oriented to pass light having the second polarization direction and to block light having the first polarization direction.

8. The stereoscopic display system of claim 7 wherein the exit surface of the multi-layer light transmitting device is a lenticulated surface for collimating the first and second beam components.

9. The stereoscopic display of claim 7 wherein each of the first and second plurality of controllable polarizing elements comprise:

an electro-optic medium having an electric field controllable birefringence; and electrode means for applying an electric field to the electro-optic medium.

10. The stereoscopic display system of claim 7 wherein the vibration azimuth of the first portion corresponds to the first polarization direction and the vibration azimuth of the second portion corresponds to the second polarization direction.

11. The stereoscopic display of claim 10 wherein the means for individually controlling the vibration azimuths comprises:

a first plurality of controllable polarizing elements arranged to intercept the second beam components for changing the vibration azimuth of the second beam components from the second polarization direction to the first polarization direction when the first image is projected by the image generating means; and a second plurality of controllable polarizing elements arranged to intercept the first beam components for changing the vibration azimuth of the first beam component from the first polarization direction to the second polarization direction when the second image is projected by the image generating means.

12. The stereoscopic display of claim 7 wherein the vibration azimuths of the first and second portion do not correspond to the first or the second polarization direction.

13. The stereoscopic display of claim 12 wherein the means for individually controlling the vibration azimuths comprises:

optically active isotropic layer means for changing the orientation of the vibration azimuths of the first and second portions so that the vibration azimuth of the first portion corresponds to the first polarization direction and the vibration azimuth of the second portion corresponds to the second polarization direction;

a first plurality of controllable polarizing elements arranged to intercept the second beam components for changing the vibration azimuth of the second beam components from the second polarization direction to the first polarization direction when the first image is projected by the image generating means; and a second plurality of controllable polarizing elements arranged to intercept the first beam components for changing the vibration azimuth of the first beam components from the first polarization direction to the second polarization direction when the second image is projected by the image generating means.

14. A stereoscopic display system for providing stereoscopic images on a common screen which are viewable by viewers at random positions within a prescribed viewing area, the stereoscopic display system comprising:

image generating means for sequentially projecting on the common screen first and second images of a scene to produce a presentation in which the first and second images are shown alternately for substantially equal time periods;

controllable polarizing means proximate the image generating means for providing the first images with a first polarization direction and for providing the second images with a second polarization direction, the controllable polarizing means comprising:

polarizer means for polarizing light emerging from the image generating means, and means for mechanically orienting the polarizer means to provide the first images with the first polarization direction and to provide the second images with the second polarization direction;

synchronizing means for synchronizing the operation of the image generating means and the controllable polarizing means;

first analyzer means adapted to be positioned proximate a first eye of a viewer, the first analyzer means being oriented to pass light having the first polarization direction and to block light having the second polarization direction; and second analyzer means adapted to be positioned proximate a second eye of a viewer, the second analyzer means being oriented to pass light having the second polarization direction and to block light having the first polarization direction.

15. The stereoscopic display of claim 14 wherein the means for orienting the polarizer means comprise motor means for rotating the polarizer means.

16. The stereoscopic display of claim 14 wherein the polarizer means comprises:

a linear polarizer, and a quarter-wave plate.

17. The stereoscopic display of claim 16 wherein the means for orienting the polarizer means, comprise motor means for causing rotation of quarter-wave plate with respect to the linear polarizer.

* * * * *